United States Patent [19]
Smith et al.

[11] Patent Number: 6,010,762
[45] Date of Patent: Jan. 4, 2000

[54] SELF-EVACUATING VACUUM INSULATION PANELS

[75] Inventors: Douglas Michael Smith, Albuquerque, N.Mex.; R. Ulrich Boes, Neu Isenburg, Germany; Kevin Roderick, Albuquerque, N.Mex.

[73] Assignee: Cabot Corporation, Boston, Mass.

[21] Appl. No.: 09/007,716

[22] Filed: Jan. 15, 1998

[51] Int. Cl.$^7$ .................................. B32B 1/06; B32B 5/16
[52] U.S. Cl. ................................ 428/69; 428/76; 52/788.1
[58] Field of Search ...................... 428/69, 76; 52/788.1

[56] References Cited

U.S. PATENT DOCUMENTS

| | | |
|---|---|---|
| 3,147,877 | 9/1964 | Beckman . |
| 3,152,033 | 10/1964 | Black . |
| 3,271,924 | 9/1966 | Gramm et al. . |
| 3,302,358 | 2/1967 | Jackson . |
| 3,625,896 | 12/1971 | Kirk . |
| 3,668,881 | 6/1972 | Thibault . |
| 3,695,483 | 10/1972 | Pogorski . |
| 3,794,712 | 2/1974 | Aboutboul et al. . |
| 3,812,886 | 5/1974 | Hallwood . |
| 3,818,715 | 6/1974 | Scurlock . |
| 3,828,960 | 8/1974 | Walles . |
| 4,154,363 | 5/1979 | Barthel . |
| 4,215,798 | 8/1980 | Patterson et al. . |
| 4,444,821 | 4/1984 | Young . |
| 4,492,725 | 1/1985 | Ishihara et al. ...................... 428/69 |
| 4,579,756 | 4/1986 | Edgel . |
| 4,594,279 | 6/1986 | Yoneno . |
| 4,606,196 | 8/1986 | Acharya . |
| 4,636,416 | 1/1987 | Kratel . |
| 4,667,390 | 5/1987 | Acharya . |
| 4,726,974 | 2/1988 | Nowobilski . |
| 4,745,015 | 5/1988 | Cheng . |
| 4,950,421 | 8/1990 | Davis . |
| 5,018,328 | 5/1991 | Cur . |
| 5,032,439 | 7/1991 | Glicksman . |
| 5,090,981 | 2/1992 | Rusek . |
| 5,094,899 | 3/1992 | Rusek . |
| 5,107,649 | 4/1992 | Benson . |
| 5,143,770 | 9/1992 | Gonczy . |
| 5,160,769 | 11/1992 | Garrett . |
| 5,175,975 | 1/1993 | Benson . |
| 5,224,832 | 7/1993 | Gonczy . |
| 5,252,408 | 10/1993 | Bridges . |
| 5,256,858 | 10/1993 | Tomb . |
| 5,271,980 | 12/1993 | Bell . |
| 5,273,801 | 12/1993 | Barry . |
| 5,284,692 | 2/1994 | Bell . |
| 5,316,816 | 5/1994 | Sextl . |
| 5,327,703 | 7/1994 | Cur . |
| 5,331,789 | 7/1994 | Cur . |
| 5,362,541 | 11/1994 | Sextl . |
| 5,364,577 | 11/1994 | Cur . |
| 5,376,424 | 12/1994 | Watanabe . |
| 5,376,449 | 12/1994 | Harris et al. . |
| 5,386,706 | 2/1995 | Bergsten . |
| 5,445,857 | 8/1995 | Nowobilski . |
| 5,480,696 | 1/1996 | Harris . |
| 5,500,305 | 3/1996 | Bridges . |
| 5,508,106 | 4/1996 | Yoshino . |
| 5,509,248 | 4/1996 | Dellby . |
| 5,512,345 | 4/1996 | Tsutsumi . |
| 5,527,411 | 6/1996 | Jutte . |
| 5,591,505 | 1/1997 | Rusek . |
| 5,601,897 | 2/1997 | Vermillion . |
| 5,652,278 | 7/1997 | Barker . |
| 5,664,396 | 9/1997 | Lyman . |

FOREIGN PATENT DOCUMENTS 921 273   3/1963   United Kingdom .

*Primary Examiner*—Alexander Thomas

[57] ABSTRACT

The present invention provides an insulation panel comprising an air-impermeable container and disposed therein a gas and an adsorbent material that has a surface area of at least about 200 m$^2$/g and that adsorbs more of the gas at a temperature below about 0° C. than at 22° C., wherein the pressure in the container at −34° C. is not more than about 80% of the pressure in the container at 22° C. The present invention also provides a method of insulating a surface from environmental thermal effects comprising placing the insulation panel of the present invention over the surface to be insulated.

24 Claims, 1 Drawing Sheet

6,010,762

SELF-EVACUATING VACUUM INSULATION PANELS

TECHNICAL FIELD OF THE INVENTION

The present invention relates to self-evacuating vacuum insulation panels and methods for preparing and using the same.

BACKGROUND OF THE INVENTION

It has long been known that a vacuum is a good insulator. Accordingly, vacuum insulation panels are useful in a variety of insulation environments. While vacuum insulation panels can be quite desirable, they can be expensive to prepare. In particular, there are difficulties and relatively high costs associated with the creation of the vacuum and in forming the physical shape of the container. For example, U.S. Pat. No. 5,107,649 discloses an insulation panel comprising two bendable metal wall sheets and spacers therebetween, wherein the metal sheets are welded together and a vacuum is formed therewithin.

In order to avoid the difficulties associated with the preparation of vacuum insulation panels of the foregoing type, attempts have been made at preparing vacuum panels that are self-evacuating, i.e., that do not involve the need to create a vacuum at the time the insulation panel is produced, but rather involve the formation of a vacuum in situ at the time the insulation panel becomes cold by contacting a cold source. For example, U.S. Pat. No. 3,812,886 discloses an insulating sleeve with a perlite core that is sealed in an envelope which is filled with a condensible gas such as carbon dioxide. When the insulating sleeve becomes cold by being positioned near a cold source, the carbon dioxide condenses, thereby establishing an insulating vacuum. Similarly, U.S. Pat. No. 5,160,769 discloses an insulating enclosure comprising a foamed material containing carbon dioxide-filled cells. When the insulating enclosure becomes cold by contacting a sufficiently cold source, the carbon dioxide solidifies, thereby establishing an insulating vacuum.

While self-evacuating vacuum insulation panels have been previously described, there remains a need for an improved self-evacuating vacuum insulation panel and a method of preparing same. The present invention provides such a self-evacuating vacuum insulation panel and method of preparing same. In particular, the present inventive insulation panel can provide a greater vacuum under similar preparation and use conditions than conventional self-evacuating insulation panels. These and other advantages of the present invention, as well as additional inventive features, will be apparent from the description of the invention provided herein.

BRIEF SUMMARY OF THE INVENTION

The present invention provides an insulation panel comprising an air-impermeable container and disposed therein a gas and an adsorbent material that has a surface area of at least about 200 $m^2/g$ and that adsorbs more of the gas at a temperature below about 0° C. than at 22° C., wherein the pressure in the container at −34° C. is not more than about 80% of the pressure in the container at 22° C. The present invention also provides a method of insulating a surface from environmental thermal effects comprising placing the insulation panel of the present invention over the surface to be insulated.

DESCRIPTION OF THE PREFERRED EMBODIMENTS

Figure 1:
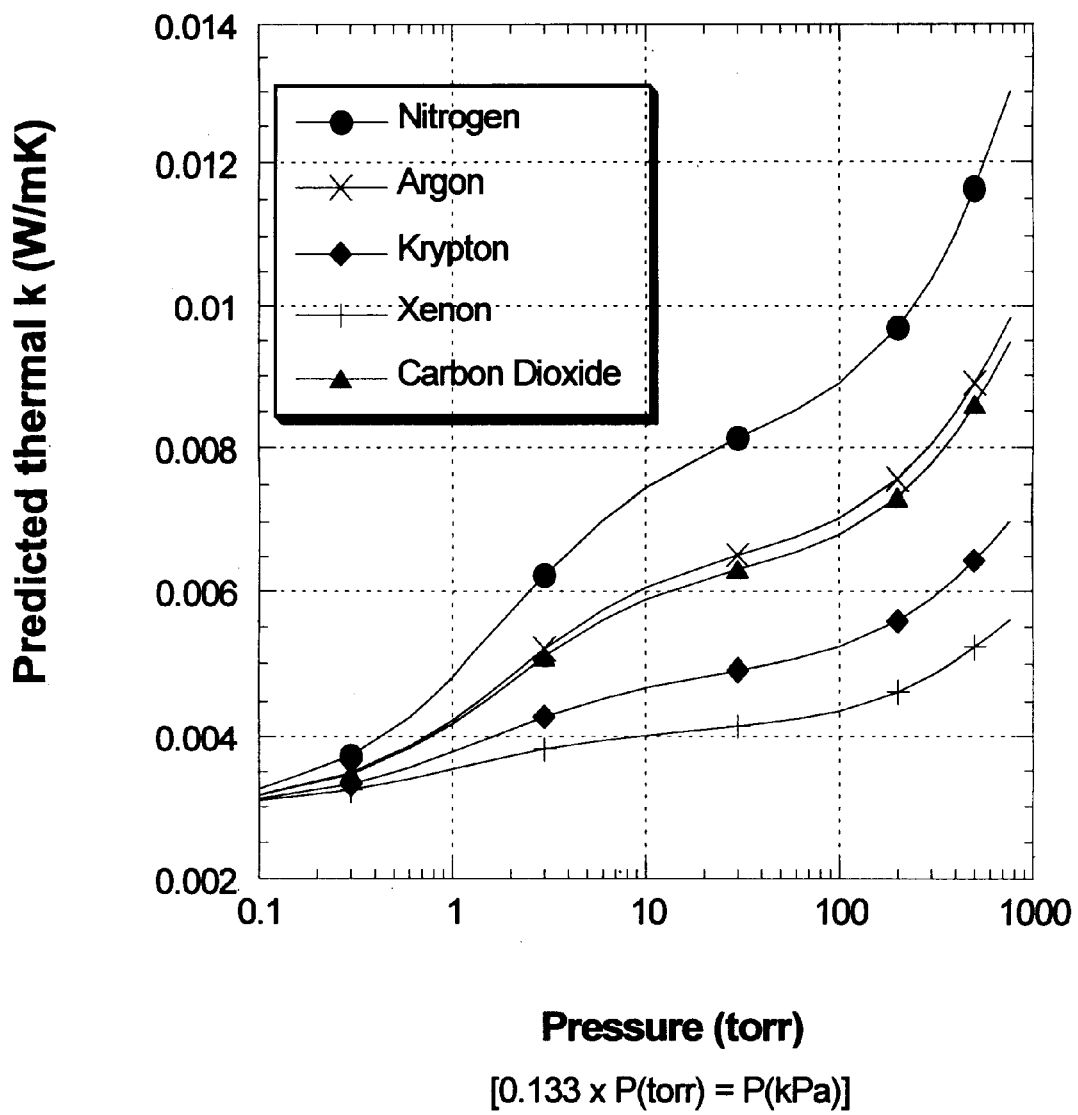
FIG. 1 is a graph illustrating the predicted thermal conductivity k (W/mK) versus pressure for various gases: nitrogen, argon, krypton, xenon, and carbon dioxide.

The present invention is predicated, at least in part, on the behavior of a gas and an absorbent material for the gas at different temperatures. In particular, a fixed amount of a gas in an impermeable container generally will take up less volume at a lower temperature, i.e., a lower pressure state or partial vacuum will be created in the container. In the presence of an absorbent material for the gas, this effect has been discovered to be more pronounced, thereby allowing for the preparation of an insulation panel at atmospheric pressure, or at a pressure less than atmospheric pressure but above conventional vacuum pressures, that nevertheless provides a lower pressure or a conventional vacuum pressure during use, i.e., when in contact with a cold source.

In particular, the present invention provides an insulation panel comprising an air-impermeable container and disposed therein a gas and an adsorbent material that has a surface area of at least about 200 $m^2/g$ and that adsorbs more of the gas at a temperature below about 0° C. than at 22° C., wherein the pressure in the container at −34° C. is not more than about 80% of the pressure in the container at 22° C.

The present invention eliminates the need for creating a significant vacuum, or even a vacuum at all, in the container of the insulation panel at the time of its preparation, thereby resulting in reduced panel cost and faster production of the insulation panel. Moreover, a moderate vacuum level in the container during its preparation can yield an ultimate thermal performance during insulation use which is equivalent to the thermal performance of an insulation panel prepared with a much greater vacuum level. Similarly, a more significant vacuum level in the container during its preparation can yield a superior thermal performance during insulation use as compared to the thermal performance of an insulation panel prepared with an equivalent vacuum level. In other words, because the present inventive insulation panel is self-evacuating and the gas condenses and adsorbs onto the surface of the adsorbent material, the present invention can create a greater vacuum than previously known self-evacuating vacuum insulation panels under similar conditions (e.g., similar container pressure at ambient temperature). This can be accomplished while still allowing the present inventive insulation panel to be flexible during its preparation and application to a cold source in need of insulation, thereby allowing it to be formed and shaped during the application to the surface to be insulated.

The container of the present inventive insulation panel can be of any suitable material. Preferably the material is flexible so that the container can be configured (e.g., shaped or formed) to a variety of surfaces to be insulated. Plastic (especially in the form of thin plastic sheets) is a preferable material for the container.

The pressure within the container of the present inventive insulation panel can be any suitable pressure at 22° C. For example, the pressure in the container at 22° C. preferably is atmospheric pressure, e.g., about 80–110 kPa (about 600–800 torr). Of course, the atmospheric pressure will vary depending on such factors as altitude and weather. Generally, the atmospheric pressure will be about 100 kPa (about 760 torr) at sea level, but can range to about 80 kPa (about 600 torr) at 2000 meters elevation.

The present inventive insulation panel will lose flexibility as the pressure in the container decreases. Thus, if a panel that is flexible at 22° C. is desired, then a higher pressure, e.g., atmospheric pressure, at 22° C. will be preferred in the container. Typically, with a container constructed of thin plastic sheets, the panel will lose significant flexibility when the pressure in the container is less than about 40–55 kPa (about 300–400 torr), with a substantial loss of flexibility when the pressure in the container is less than about 25 kPa (about 200 torr).

If flexibility of the panel is not important or not desired, the pressure in the container at 22° C. can be significantly less than atmospheric pressure. In such embodiments, the pressure in the container at 22° C. preferably is about 15 kPa (about 100 torr) or less (e.g., about 0.1–15 kPa (about 1–100 torr)), more preferably about 1 kPa (about 10 torr) or less (e.g., about 0.001–1 kPa (about 0.01–10 torr)), and most preferably 0.1 kPa (about 1 torr) or less (e.g., about 0.001–0.1 kPa (about 0.01–1 torr)).

The pressure in the container at −34° C. is not more than 80% of the pressure in the container at 22° C. Desirably, the pressure in the container at −34° C. is not more than 65%, preferably not more than 60%, more preferably not more than 50%, and even more preferably not more than 30%, of the pressure in the container at 22° C. Most preferably, the pressure in the container at −34° C. is not more than 20%, e.g., not more than 10%, of the pressure in the container at 22° C.

Any suitable gas can be used in the container of the insulation panel so long as the gas, in combination with the adsorbent material, has a pressure in the container at −34° C. which is not more than about 80% of the pressure in the container at 22° C. While mixtures of gases can be used in the container, typically the gas will be a single gas or substantially all a single gas. Suitable gases desirably have a lower thermal conductivity as compared to nitrogen/air, such as argon, carbon dioxide, krypton, and xenon. Preferably, the gas in the insulation panel is substantially all carbon dioxide. Carbon dioxide is preferred because it is relatively inexpensive, has a low gas conductivity, and is adsorbed onto various materials at temperatures moderately below ambient temperature (e.g., 22° C.). Furthermore, carbon dioxide allows for improved thermal performance as compared to a nitrogen/air filled panel at atmospheric pressure (e.g., about 80–110 kPa (about 600–800 torr)). Other preferred gases are krypton and xenon.

The adsorbent material can be any suitable material that, in combination with the gas, results in the aforementioned pressure decrease in the container of the present inventive insulation panel and, desirably, also is a good thermal insulant. A preferred adsorbent material is silica, particularly in a hydrophilic (rather than hydrophobic) state. More preferably, the adsorbent material is a silica gel or a silica aerogel. Another preferred adsorbent material is carbon, more preferably activated carbon. The adsorbent material can be a combination of two or more different materials. A particularly preferred embodiment in that respect is the combination of silica and carbon, especially a silica aerogel and activated carbon. Both silica and carbon are good adsorbent materials, but silica also is a good insulation material per se and carbon can assist in the insulation function by rendering the insulation panel opaque, preferably black. Thus, activated carbon has the advantages of decreasing infrared radiation transfer as well as being an excellent adsorbent for many gases, such as carbon dioxide. Any suitable amount of carbon can be present relative to the amount of silica. The activated carbon preferably is present in an amount from about 1 wt. % to about 30 wt. % based upon the weight of the silica particles.

The adsorbent material can be in any suitable form, preferably in the form of particles. Adsorbent material particles can have any suitable particle size. Generally, when the adsorbent material is silica, the silica particles preferably are less than about 500 $\mu$m in diameter. When the adsorbent material is carbon, particularly activated carbon, the carbon particles preferably are less than about 100 $\mu$m in diameter.

The adsorbent material has a surface area of at least about 200 $m^2/g$. Generally, higher surface areas are more desirable inasmuch as there is an increasing insulation effect and adsorptive capacity with increasing surface area. Thus, the surface area of the adsorbent material, particularly when it is silica, is preferably at least about 400 $m^2/g$, more preferably at least about 600 $m^2/g$, and most preferably at least about 800 $m^2/g$.

The present invention also provides a method of insulating a surface from environmental thermal effects comprising placing the insulation panel of the present invention over the surface to be insulated. The present inventive insulation panel can be used to insulate any suitable surface, e.g., storage containers, tanks, piping, etc.

The combination of a flexible container and a flexible adsorbent material, e.g., in the form of particles, ensures that the insulation panel will be flexible at ambient temperatures. Thus, the insulation panel can be physically shaped during preparation and/or during application to a cold surface to be insulated, after which, upon cooling, a vacuum is formed in the container, thereby causing the insulation panel to become rigid.

The following examples further illustrate the present invention but, of course, should not be construed as in any way limiting its scope.

EXAMPLE 1

This example demonstrates the increased thermal performance of gases at different pressures as calculated for a compact of 0.1 $g/cm^3$ aerogel granules at ambient temperature as a function of filler gas and pressure.

The framework for thermal transport modeling in aerogels is well-established. See Fricke et al., *Int. J. Heat Mass Transfer*, 35, 2305 (1992), Hrubesh and Pekala, *J. Mater. Res.*, 9, 731 (1994), Zeng et al., *J. Non-Cryst. Solids*, 186, 264 (1995). Heat transfer in a low density, porous solid such as an aerogel consists of three mechanisms: (1) solid phase conduction, (2) gas phase conduction in the pores, and (3) thermal radiation. The modeling approach used to calculate the data for this example directly follows that described in Hrubesh and Pekala, supra, with three changes. An additional gas phase conduction term is used for intergranular heat transfer. The pore size used for the intergranular region is calculated as the hydraulic diameter using the granule diameter and the packing fraction $\phi$. $\phi$ is defined as the volume fraction of granules in the compact. For the intragranular pore size, density and surface area were fixed since those are the properties that can be controlled during synthesis. The average pore size, which is taken as the hydraulic diameter, for a given density is bounded by a practical surface area range of 100–1,000 $m^2/g$. The addition of an opacifier for thermal radiation is accounted for by: (a) varying the specific extinction coefficient and (b) either a series or parallel model addition of the opacifier solid phase thermal conductivity. The sum of the individual components is taken as the overall thermal conductivity:

$$k_{total} = k_{radiation} + k_{solid,granules} + k_{gas,granules} + k_{gas,intergranular}$$

The first two components, $k_{radiation}$ and $k_{solid,granules}$, are independent of gas pressure and type. The gas phase conductivity in the granules varies with gas pressure in the vicinity of ambient pressure (depending on the pore size).

Much lower pressures are required to lower gas phase conduction in the intergranular regions. These are calculated k values for an non-opacified granular aerogel with a packing fraction of 0.7. For the thermal calculations of this example, aerogel granules with a surface area of 800 m$^2$/g, a particle size of 100 μm, and a packing fraction of 0.9 were used. The compact was assumed to contain 15 wt. % carbon and to have a density of 99.3 kg/M$^3$.

The surface area of silicas such as, for example, aerogels is based on the amount of nitrogen adsorbed at five different relative pressures over the range 0.05 to 0.25 according to the Brunauer-Emmett-Teller (BET) model, which is referenced in Gregg, S. J. and Sing, K. S. W, "Adsorption, Surface Area and Porosity," p. 285, Academic Press, New York (1991).

The resulting data was plotted in graph form and appears as FIG. 1. As is apparent from that figure, argon, carbon dioxide, krypton, and xenon have a significantly greater insulation capacity than nitrogen, particularly at higher pressures (as evidenced by the lower thermal conductivity k values). Moreover, as carbon dioxide approaches very low pressures, its thermal performance can double as compared to its thermal performance at atmospheric pressure.

were in ground form, while the adsorbent material of Sample F was in the form of granules.

In particular, for each of the samples, either no adsorbent material or a known mass of adsorbent material was placed in a glass ASAP tube (a glass tube with a spherical bulb at the bottom). Glass rods then were placed into the neck of the tube to take up additional headspace. The mass of the adsorbent material was measured both before and after the experiment in order to ensure reproducibility. The samples then were evacuated to 0.3–2 kPa (2–15 torr) for 2–3 minutes and backfilled with $CO_2$ to about 90 kPa (675 torr), and this process was repeated four times in order to ensure the removal of most atmospheric contaminants. Although the samples were not preheated in order to remove adsorbed water, much of any such contamination would have been removed by the repeated evacuation. The surface areas and densities of the adsorbent material were experimentally determined by use of isothermal gas (nitrogen). The mass, density, surface area, and volume of the adsorbent material for each of the samples, as well as the cell volume, are set forth in Table 1 below as measured after the aforementioned backfilling with $CO_2$.

TABLE 1

| Sample | Gas | Adsorbent Material | Mass (g) | Density (g/cm$^3$) | Surface Area (m$^2$/g) | Volume (cm$^3$) | Cell Volume (cm$^3$) |
|---|---|---|---|---|---|---|---|
| A | air | none | — | — | — | — | 28 |
| B | $CO_2$ | none | — | — | — | — | 28 |
| C | $CO_2$ | fumed silica | 0.4201 | 0.050 | 421 | 8.40 | 27.81 |
| D | $CO_2$ | fumed silica | 0.5138 | 0.050 | 421 | 10.28 | 23.27 |
| E | $CO_2$ | 5 wt. % hydrophilic silica aerogel | 1.0630 | 0.105 | 834 | 10.12 | 23.02 |
| F | $CO_2$ | 5 wt. % hydrophilic silica aerogel (granules) | 0.6132 | 0.080 | 714 | 7.67 | 23.22 |
| G | $CO_2$ | 5 wt. % hydrophobic silica aerogel | 1.3623 | 0.140 | 834 | 9.73 | 22.88 |
| H | $CO_2$ | 11 wt. % hydrophilic silica aerogel | 1.4217 | 0.143 | 647 | 9.94 | 22.85 |
| I | $CO_2$ | 11 wt.% hydrophilic silica aerogel + 15 wt. % activated carbon | 1.1886 | 0.161 | 716 | 7.38 | 22.96 |
| J | $CO_2$ | 11 wt. % hydrophilic silica aerogel + 15 wt. % activated carbon | 1.0029 | 0.161 | 716 | 6.23 | 23.04 |
| K | $CO_2$ | 11 wt. % hydrophilic silica aerogel + 15 wt. % activated carbon | 1.0475 | 0.161 | 716 | 6.51 | 23.02 |

EXAMPLE 2

This example illustrates the functioning of the present inventive self-evacuating vacuum insulation panel.

Similar containers were filled with carbon dioxide and either no additional material (Sample B), fumed silica (Samples C and D), hydrophilic silica aerogel (Samples E, F, and H), hydrophobic silica aerogel (Sample G), or hydrophilic silica aerogel in combination with activated carbon (Samples I, J, and K) as indicated in Table 1 below. For further comparison purposes, one container was filled with air and no additional material (Sample A). The hydrophilic and hydrophobic silica aerogels were formed from a wet (aqueous) gel, and the wt. % of silica in the precursor wet gel also is noted in Table 1. When activated carbon was present, the wt. % of the activated carbon in relation to the amount of total solids (i.e., silica and activated carbon) is noted in Table 1. The adsorbent materials of Samples C–E and G–K The samples were filled with air or carbon dioxide at the pressure indicated in Table 2 below at ambient temperature (about 22° C., and then were immersed in a slurry of ethylene glycol and water (with a freezing point of about –40° C.) cooled by dry ice to maintain a temperature between –32° C. and –38° C. The pressure was measured as a function of time while the sample was immersed in the slurry, with the final pressures noted in Table 2 below being the equilibrium pressures after long exposure times (generally 15–20 minutes) when the temperature was –34° C.±1° C. Pressures were measured using a Psitronix digital pressure gauge which measured pressure in kPa absolute with an accuracy of ±0.25 kPa, and temperatures were measured by a hand-held Omega thermometer with an accuracy of ±0.2° C. The results of the pressure measurements are set forth in Table 2 below.

TABLE 2

| Sample | Gas | Adsorbent Material | Initial Pressure (kPa) [torr] | Final Pressure (kpa) [torr] | Final/Initial Pressure (%) |
|---|---|---|---|---|---|
| A | air | none | 96.6 [725] | 84.6 [635] | 88 |
| B | $CO_2$ | none | 82.2 [617] | 71.5 [536] | 87 |
| C | $CO_2$ | fumed silica | 93.5 [701] | 56.8 [426] | 61 |
| D | $CO_2$ | fumed silica | 90.5 [679] | 50.7 [380] | 56 |
| E | $CO_2$ | 5 wt. % hydrophilic silica aerogel | 90.0 [675] | 23.3 [175] | 26 |
| F | $CO_2$ | 5 wt. % hydrophilic silica aerogel (granules) | 91.4 [686] | 29.6 [222] | 32 |

TABLE 2-continued

| Sample | Gas | Adsorbent Material | Initial Pressure (kPa) [torr] | Final Pressure (kpa) [torr] | Final/Initial Pressure (%) |
|---|---|---|---|---|---|
| F | $CO_2$ | 5 wt. % hydrophobic silica aerogel | 91.1 [683] | 39.1 [293] | 43 |
| G | $CO_2$ | 11 wt. % hydrophilic silica aerogel | 91.0 [683] | 14.1 [106] | 15 |
| H | $CO_2$ | 11 wt. % hydrophilic silica aerogel + 15% activated carbon | 91.0 [683] | 15.4 [116] | 17 |
| I | $CO_2$ | 11 wt. % hydrophilic silica aerogel + 15% activated carbon | 91.0 [683] | 11.3 [85] | 12 |
| J | $CO_2$ | 11 wt. % hydrophilic silica aerogel + 15% activated carbon | 91.0 [683] | 11.9 [89] | 13 |

As is apparent from the foregoing data for Samples A and B, the use of air and carbon dioxide alone, i.e., without an adsorbent material, resulted in pressures at −34° C. that were only 87–88% of the pressures at 22° C. The use of fumed silica as the adsorbent material, as was done in Samples C and D, resulted in a significantly greater pressure drop, specifically pressures at −34° C. that were 56–61% of the pressures at 22° C. Even further improvements accompanied the use of silica aerogels, especially hydrophilic silica aerogel. In particular, the use of a hydrophobic silica aerogel in Samples G and hydrophilic silica aerogels in Samples E, F, and H resulted in pressures at −34° C. that were 43% and 15–32%, respectively, of the pressures at 22° C. The presence of activated carbon with the hydrophilic silica aerogels in Samples I, J, and K resulted in pressures at −34° C. that were 12–17% of the pressures at 22° C. These data confirm that the present inventive self-evacuating vacuum panel can produce a significant insulating vacuum even when the initial gas pressure in the panel is relatively high, e.g., at or near atmospheric pressure.

EXAMPLE 3

This example further illustrates the functioning of the present inventive self-evacuating vacuum insulation panel.

The experimental protocol recited in Example 2 was repeated, except that similar containers were filled with carbon dioxide at different initial pressures and hydrophobic silica aerogel. The mass, density, surface area, and volume of the adsorbent material for each of the samples, as well as the cell volume, are set forth in Table 3 below as measured in the same manner recited in Example 2.

TABLE 3

| Sample | Gas | Adsorbent Material | Mass (g) | Density (g/cm$^3$) | Surface Area (m$^2$/g) | Volume (cm$^3$) | Cell Volume (cm$^3$) |
|---|---|---|---|---|---|---|---|
| L | $CO_2$ | 11 wt. % hydrophobic silica aerogel | 1.3691 | 0.143 | 647 | 9.57 | 22.88 |
| M | $CO_2$ | 11 wt. % hydrophobic silica aerogel | 1.3165 | 0.143 | 647 | 9.21 | 22.90 |
| N | $CO_2$ | 11 wt. % hydrophobic silica aerogel | 1.3627 | 0.143 | 647 | 9.53 | 22.88 |
| O | $CO_2$ | 11 wt. % hydrophobic Silica aerogel | 1.3487 | 0.143 | 647 | 9.43 | 22.89 |

The samples were treated in the same manner as in Example 2, and the results of the pressure measurements are set forth in Table 4 below.

TABLE 4

| Sample | Gas | Adsorbent Material | Initial Pressure (kPa) [torr] | Final Pressure (kpa) [torr] | Final/Initial Pressure (%) |
|---|---|---|---|---|---|
| L | $CO_2$ | 11 wt. % hydrophobic silica aerogel | 70.5 [529] | 17.1 [128] | 24 |
| M | $CO_2$ | 11 wt. % hydrophobic silica aerogel | 72.0 [540] | 14.6 [110] | 20 |
| N | $CO_2$ | 11 wt. % hydrophobic silica aerogel | 50.0 [375] | 8.3 [62] | 17 |
| O | $CO_2$ | 11 wt. % hydrophobic silica aerogel | 32.5 [244] | 5.3 [40] | 16 |

As is apparent from a comparison of the foregoing data for Samples L, M, N, and O, the use of an adsorbent material significantly reduces the pressure in the present inventive self-evacuating vacuum panel irrespective of the initial gas pressure. The pressure at −34° C. was 20–24% of the pressure at 22° C. when the initial pressure was about 70% of atmospheric pressure at sea level as in Samples L and M. Similarly, the pressure at −34° C. was 17 and 16% of the pressure at 22° C. when the initial pressure was about 50% and 30%, respectively, of atmospheric pressure at sea level as in Samples N and O, respectively.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specific ally described herein. Accordingly, this invention includes all modifications encompassed within the spirit and scope of the invention as defined by the following claims.

What is claimed is:

1. An insulation panel comprising an air-impermeable container and disposed therein a gas and an adsorbent material that has a surface area of at least about 200 $m^2/g$ and that adsorbs more of said gas at a temperature below about 0° C. than at 22° C., wherein the pressure in said container at −34° C. is not more than about 50% of the pressure in said container at 22° C.

2. The insulation panel of claim 1, wherein the pressure in said container at 22° C. is about 80–110 kPa.

3. The insulation panel of claim 2, wherein the pressure in said container at −34° C. is not more than 30% of said pressure in said container at 22° C.

4. The insulation panel of claim 2, wherein the pressure in said container at −34° C. is not more than 20% of said pressure in said container at 22° C.

5. The insulation panel of claim 2, wherein the pressure in said container at −34° C. is not more than 10% of said pressure in said container at 22° C.

6. The insulation panel of claim 2, wherein said adsorbent material comprises silica particles.

7. The insulation panel of claim 6, wherein said adsorbent material further comprises carbon.

8. The insulation panel of claim 6, wherein said adsorbent material further comprises activated carbon.

9. The insulation panel of claim 8, wherein said activated carbon is present in an amount of from about 1 wt. % to about 30 wt. % based upon the weight of the silica particles.

10. A method of insulating a surface from environmental thermal effects comprising placing an insulation panel of claim 8 over said surface.

11. A method of insulating a surface from environmental thermal effects comprising placing an insulation panel of claim 6 over said surface.

12. The insulation panel of claim 2, wherein said adsorbent material comprises fumed silica.

13. The insulation panel of claim 2, wherein said adsorbent material comprises silica gel.

14. The insulation panel of claim 2, wherein said adsorbent material comprises silica aerogel.

15. The insulation panel of claim 1, wherein said gas is substantially all carbon dioxide.

16. The insulation panel of claim 1, wherein said gas is substantially all krypton.

17. The insulation panel of claim 1, wherein said gas is substantially all xenon.

18. The insulation panel of claim 1, wherein said adsorbent material has a surface area of at least about 400 $m^2/g$.

19. The insulation panel of claim 18, wherein said adsorbent material has a surface area of at least about 600 $m^2/g$.

20. The insulation panel of claim 19, wherein said adsorbent material has a surface area of at least about 800 $m^2/g$.

21. The insulation panel claim 1, wherein the pressure in said container at 22° C. is about 15 kPa or less.

22. The insulation panel of claim 1, wherein the pressure in said container at 22° C. is about 1 kPa or less.

23. The insulation panel of claim 22, wherein the pressure in said container at 22° C. is about 0.1 kPa or less.

24. A method of insulating a surface from environmental thermal effects comprising placing an insulation panel of claim 1 over said surface.

* * * * *